(12) United States Patent
Atzel et al.

(10) Patent No.: US 12,647,646 B2
(45) Date of Patent: Jun. 2, 2026

(54) DETECTING THE STATUS OF A TELEVISION SET

(71) Applicant: SAGEMCOM BROADBAND SAS, Rueil Malmaison (FR)

(72) Inventors: Loïg Atzel, Rueil Malmaison (FR); Marc Gallet, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 18/079,591

(22) Filed: Dec. 12, 2022

(65) Prior Publication Data

US 2023/0188783 A1 Jun. 15, 2023

(30) Foreign Application Priority Data

Dec. 13, 2021 (FR) .................................. FR2113399

(51) Int. Cl.
| | |
|---|---|
| *H04N 21/44* | (2011.01) |
| *H04N 21/422* | (2011.01) |
| *H04N 21/4363* | (2011.01) |
| *H04N 21/442* | (2011.01) |

(52) U.S. Cl.
CPC ..... *H04N 21/442* (2013.01); *H04N 21/42203* (2013.01); *H04N 21/43635* (2013.01)

(58) Field of Classification Search
None
See application file for complete search history.

(56) References Cited

U.S. PATENT DOCUMENTS

| | | | |
|---|---|---|---|
| 9,420,326 B1 * | 8/2016 | Kessler | ................ H04N 21/482 |
| 2021/0065719 A1 * | 3/2021 | Wang | .................... G06F 16/783 |
| 2021/0098137 A1 | 4/2021 | Carroll et al. | |

FOREIGN PATENT DOCUMENTS

| | | |
|---|---|---|
| EP | 3480813 A1 | 5/2019 |
| WO | WO2019177949 A1 | 9/2019 |

OTHER PUBLICATIONS

French Search Report dated Jun. 27, 2022 in FR Application No. 2113399, 2 pages is attached.

* cited by examiner

*Primary Examiner* — Samira Monshi
(74) *Attorney, Agent, or Firm* — Muncy, Geissler, Olds & Lowe, P.C.

(57) ABSTRACT

A detection method, performed prior to applying a voice recognition function to a voice signal uttered by a user and picked up by a set-top box, includes the steps of: verifying that the television set is switched on, and if not, producing a first command for switching the television set on; verifying that the set-top box is an active HDMI source of the television set, and if not, producing a second command for causing the set-top box to become the active HDMI source of the television set; while the television set is switched on and the set-top box is the active HDMI source of the television set, producing a request to start the voice recognition function.

10 Claims, 4 Drawing Sheets

DETECTING THE STATUS OF A TELEVISION SET

The invention relates to the field of set-top boxes (or "STBs") and voice recognition.

BACKGROUND OF THE INVENTION

Certain recent pieces of electronic equipment include microphones, and they can be used for performing at least part of the voice recognition function of a virtual personal assistant.

Such electronic equipment then conventionally includes a detection module. The detection module acquires an audio signal, as produced by the microphones picking up a sound signal. When the detection module of the electronic equipment detects that a keyword for activating the voice recognition function has been uttered by a user, the audio signal produced by the microphones is transmitted to a voice recognition module. The voice recognition function is then performed by the voice recognition module, which analyzes the audio signal and detects voice commands uttered by the user. The electronic equipment then undertakes the actions that correspond to the voice commands.

The voice recognition module may be incorporated locally in the electronic equipment, or else it may be remote in one or more external pieces of equipment different from the electronic equipment in question, e.g. in one or more remote servers (in the "cloud"). In the remote configuration, the audio signal produced by the microphones is transmitted by the electronic equipment to the voice recognition module via the Internet (possibly after being subjected in the electronic equipment to processing, e.g. to echo cancelling), and the voice commands are returned by the voice recognition module to the electronic equipment.

In general, a piece of electronic equipment that performs such a voice recognition function has one or more loudspeakers for providing a user with feedback (voice feedback) for the purpose of guiding the user in the event of an anomaly in the interpretation of the voice commands.

Proposals have been made to perform a voice recognition function in a set-top box. However, most set-top boxes do not include a loudspeaker, which prevents them providing such user feedback.

OBJECT OF THE INVENTION

An object of the invention is to provide user feedback for a voice recognition function performed at least in part in a set-top box that does not include a loudspeaker.

SUMMARY OF THE INVENTION

In order to achieve this object, there is provided a detection method, performed in a set-top box having an HDMI port connected via an HDMI cable to a television set, the detection method being performed prior to applying a voice recognition function to a voice signal uttered by a user and picked up by the set-top box, the detection method comprising the steps of:

verifying that the television set is switched on, and if not, producing a first command for switching the television set on;

verifying that the set-top box is an active HDMI source of the television set, and if not, producing a second command for causing the set-top box to become the active HDMI source of the television set;

while the television set is switched on and the set-top box is the active HDMI source of the television set, producing a request to start the voice recognition function.

In order to mitigate the absence of a loudspeaker in the set-top boxes, the television set is thus used to provide (visual or sound) user feedback when a voice recognition function is being applied.

The set-top box thus verifies whether the television set is switched on and whether the set-top box is indeed the active HDMI source of the television set—and if one or the other of the two conditions is not satisfied, it produces the first command and/or the second command.

The set-top box thus determines automatically and independently whether user feedback is available, and if so, it triggers the voice recognition function.

There is also provided a detection method as described above, further comprising the steps of verifying that the television set is compatible with a CEC protocol and, if so, of using the CEC protocol to verify that the television set is switched on and that the set-top box is the active HDMI source of the television set, and, where necessary, of producing the first command and/or the second command.

There is also provided a detection method as described above, including, for verifying that the television set is switched on, the step of using an HPD signal, and then an RXSense signal and/or a signal generated by an HDCP protocol.

There is also provided a detection method as described above, including, for verifying that the decoder is the active HDMI source of the television set, the steps of:

using the HDMI port to issue an issued audio signal comprising a test signal;

acquiring a received audio signal produced by one or more microphones of the set-top box;

determining whether a resultant signal, which is representative of the difference between the received audio signal and the issued audio signal, is less than a predetermined threshold;

if so, deducing that the set-top box is indeed the active HDMI source of the television set.

There is also provided a detection method as described above, the set-top box incorporating an echo canceller module, and the resultant signal being a signal output by the echo canceller module.

There is also provided a detection method as described above, wherein, if the television set is not switched on and/or if the decoder is not the active HDMI source of the television set, the first command and/or the second command are transmitted to a remote control of the set-top box to cause the remote control to produce a first secondary command for switching the television set on and/or a second secondary command to cause the set-top box to become the active HDMI source of the television set.

There is also provided a detection method as described above, wherein the remote control is arranged to control the television set via an infrared link, the detection method further comprising the steps of acquiring a first infrared code and/or a second infrared code and of transmitting the first infrared code and/or the second infrared code to the remote control, the first infrared code being used by the remote control to produce the first secondary command and the second infrared code being used by the remote control to produce the second secondary command.

There is also provided a detection method as described above, wherein acquisition of the first infrared code and/or of the second infrared code consists in accessing an EDID of the television set, or in acquiring identification information for the television set as provided by a user via a menu for configuring the set-top box, or in acquiring identification information for the television set as provided by the user via a setup procedure performed with the remote control.

There is also provided a set-top box including an HDMI port, at least one microphone, and a processor unit arranged to perform the detection method as described above.

There is also provided a computer program including instructions that cause the processor unit of the set-top box as described above to execute the steps of the detection method as described above.

There is also provided a computer-readable storage medium, storing the above-described computer program.

The invention can be better understood in the light of the following description of a particular, nonlimiting implementation of the invention.

BRIEF DESCRIPTION OF THE DRAWINGS

Reference is made to the accompanying drawings, in which.

DETAILED DESCRIPTION OF THE INVENTION

Figure 1:
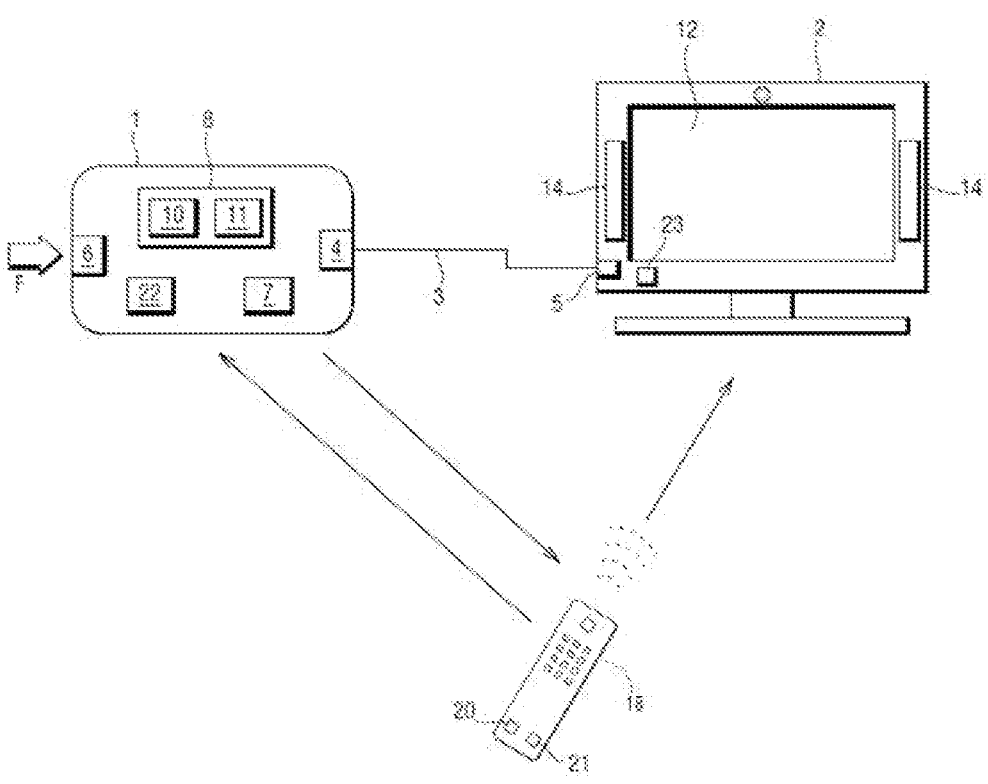
FIG. 1 shows a television set, a set-top box, and a remote control.

With reference to FIG. 1, a set-top box 1 is connected to a television set 2 via a high definition multimedia interface (HDMI) cable 3. The HDMI cable 3 connects an HDMI port 4 of the set-top box 1 to an HDMI port 5 of the television set 2.

The set-top box 1 also includes an input port 6, microphones 7, and a processor unit 8.

The processor unit 8 is an electronic and software unit comprising one or more processor components 10 mounted on one or more circuit cards.

By way of example, the or each processor component 10 comprises a general-purpose processor, a processor specialized in signal processing (known as a digital signal processor (DSP)), a microcontroller, or indeed a programmable logic circuit such as a field programmable gate array (FPGA) or an application-specific integrated circuit (ASIC). The processor components 10 are adapted to executing program instructions. The processor unit 8 also comprises one or more memories 11 in which the programs are stored. The invention is not limited to any particular architecture for the processor unit 8.

The processor unit 8 makes use of a plurality of functional modules.

In conventional manner, the processor unit 8 begins by making use of a decoder module and a synchronization module.

Via its input port 6, the set-top box 1 may receive a transport stream (TS) F for transporting digital television signals. The transport stream F may be transmitted to the set-top box 1 by cable, by satellite, or indeed over an Internet protocol (IP) link (e.g. a DASH or HLS link), i.e. via a link that makes use of an Internet protocol.

The transport stream F includes a video stream comprising video samples, and an audio stream comprising audio samples.

The decoder module decodes the video samples and the audio samples. The synchronization module synchronizes the video samples and the audio samples.

The processor unit 8 then issues both an issued audio signal (comprising the audio samples) and also an issued video signal (comprising the video samples) to the television set 2 via the HDMI port 4, the HDMI cable 3, and the HDMI port 5

The television set 2 then plays back a video signal on its screen 12 and a sound signal via its loudspeakers 14.

The processor unit 8 also performs a voice recognition function, in part.

When the user utters a voice signal including a keyword, the voice signal is picked up by the microphones 7 of the set-top box 1, which transmits the audio signal to remote servers via the Internet. The remote servers analyze the audio signal and return commands contained in the audio signal to the set-top box 1, which then undertakes the actions corresponding to the voice commands. Analysis of the audio signals in order to extract voice commands is therefore not performed in the set-top box 1, which explains why it is considered that the voice recognition function is performed in part only in the set-top box 1.

Figure 2:
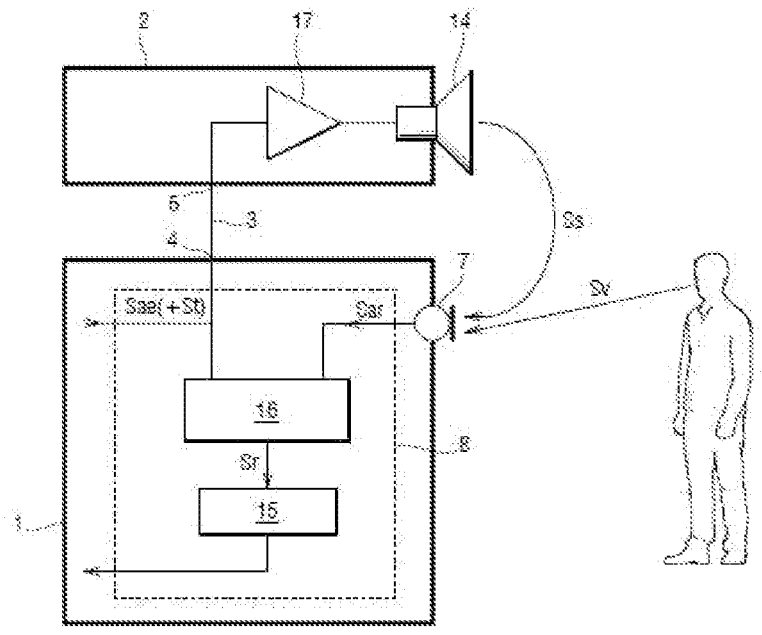
FIG. 2 shows the television set, the set-top box, and a user.

To perform this function, and with reference to FIG. 2, the processor unit 8 in this example includes a detector module 15 and an acoustic echo canceller (AEC) module 16.

The role of the detector module 15 is to detect the keyword in the voice signal Sv uttered by the user and picked up by the microphones 7 of the set-top box 1.

The role of the echo canceller module 16 is as follows.

It is possible, that when the user utters the voice signal Sv, the television set 2 is playing back a sound signal Ss. This sound signal Ss may possibly be the result of an issued audio signal Sae as produced by the set-top box 1 and transmitted by the set-top box 1 to the television set 2 via the HDMI port 4, the HDMI cable 3, and the HDMI port 5. The issued audio signal Sae is applied as input to an amplifier 17 and then to the loudspeakers 14 of the television set 2, which thus plays back the sound signal Ss.

Under such circumstances, the microphones 7 of the set-top box 1 pick up both the voice signal Sv uttered by the user and the sound signal Ss played back by the loudspeakers 14 of the television set 2, thereby degrading the quality of voice recognition.

The echo canceller module 16 thus acquires the issued audio signal Sae and the received audio signal Sar produced by the microphones 7 (which contains both the sound signal Ss and the voice signal Sv). The echo canceller module subtracts the issued audio signal Sae from the received audio signal Sar in order to deliver a "clean" resultant signal Sr that is as close as possible to the voice signal Sv (and that does not contain the sound signal Ss). It is this resultant signal Sr that is transmitted to the detector module 15 in order to detect the keyword, and to the remote servers in order to perform voice recognition.

The processor unit 8 is also arranged to perform the detection method of the invention. The memory 11 forms a computer-readable storage medium that stores a computer program including instructions for causing the processor unit 8 to execute the steps of the detection method of the invention.

Whenever a keyword is uttered by the user in order to launch the voice recognition function, the detection method seeks to ensure that the television set 2 is indeed switched on and that the set-top box 1 is indeed the active HDMI source of the television set 2.

The term "switched on" is used to mean that the television set 2 is neither switched off nor on standby.

The term "active HDMI source" is used to mean that the television set 2 is configured to read and play back the issued video signal and/or the issued audio signal potentially present on the HDMI port 5 (and thus issued by the set-top box 1 via the HDMI port 4 and the HDMI cable 3)—and is not configured to read or to play back signals produced by some other source.

If these conditions are true, the user is in a position to benefit from user feedback while the voice recognition function is being performed. This feedback takes place via the television set 2: it may thus be sound feedback (using the loudspeakers 14 of the television set 2) and/or visual feedback (using the screen 12 of the television set 2).

Since the user is in a position to benefit from feedback, the voice recognition function can be performed, and the resultant signal Sr is transmitted by the set-top box 1 to the remote servers.

The detection method is thus performed after the detection module 15 acquires (and detects) the keyword.

The processor unit 8 thus verifies that the television set 2 is switched on, and if it is not switched on, it produces a first command for switching the television set 2 on. Thereafter, the processor unit 8 verifies that the set-top box 1 is indeed the active HDMI source of the television set 2, and if not, it produces a second command for causing the set-top box 1 to become the active HDMI source of the television set 2. While the television set 2 is switched on and the set-top box 1 is the active HDMI source of the television set 2, the television set 2 is available to provide the user with sound and/or visual feedback.

Under such circumstances, the processor unit 8 produces a request to start the voice recognition function. In this example, the request consists in transmitting the resultant signal Sr to the remote servers via the Internet.

The processor unit 8 begins by verifying whether the television set 2 is compatible with the consumer electronic control (CEC) protocol.

The CEC protocol operates as follows.

The CEC protocol exchanges a CEC signal over a path that is connected to all of the HDMI ports of the television set 2 (including the HDMI port 5). The CEC signal is a bidirectional signal at a low data rate (1 kilobit per second (kbps)) that is common to all of the pieces of equipment connected to the television set 2.

The architecture of the CEC signal is relatively simple and is made up as follows:

a start sequence;

a header block giving the addresses of the source and of the destination are given;

a data block 1 containing an operation code or "opcode" for specifying the operation to be undertaken;

a data block 2 containing an operand and that is optional depending on the opcode that was sent (the operand is the element on which the operation is applied).

Each of the header block, the data block 1, and the data block 2 is encoded on 10 bits, made up of 8 payload bits, 1 end-of-message (EOM) bit, and 1 acknowledgement bit.

As soon as a new piece of equipment that is compatible with the CEC protocol is connected in the HDMI system, a physical address is allocated thereto as a function of its rank relative to the television set 2.

Once the physical address has been allocated, the equipment launches a logical address allocation sequence. The logical address is allocated to a piece of equipment with priority being given as a function of the role of that piece of equipment in the HDMI system (amplifier, tuner, recorder, etc. . . . ). The association between the physical address and the logical address of the piece of equipment is broadcast over the entire CEC system using the opcode "Report Physical Address".

A large number of opcodes are defined in the standard, some of which serve to determine the status of pieces of equipment in the CEC system, e.g. such as the opcodes "report power status" and "request active source".

If the television set 2 is compatible with the CEC protocol, the processor unit 8 makes use of the CEC protocol to verify that the television set 2 is switched on and that the set-top box 1 is indeed the active HDMI source of the television set 2, and, where necessary, to produce the first command and the second command.

Figure 3:
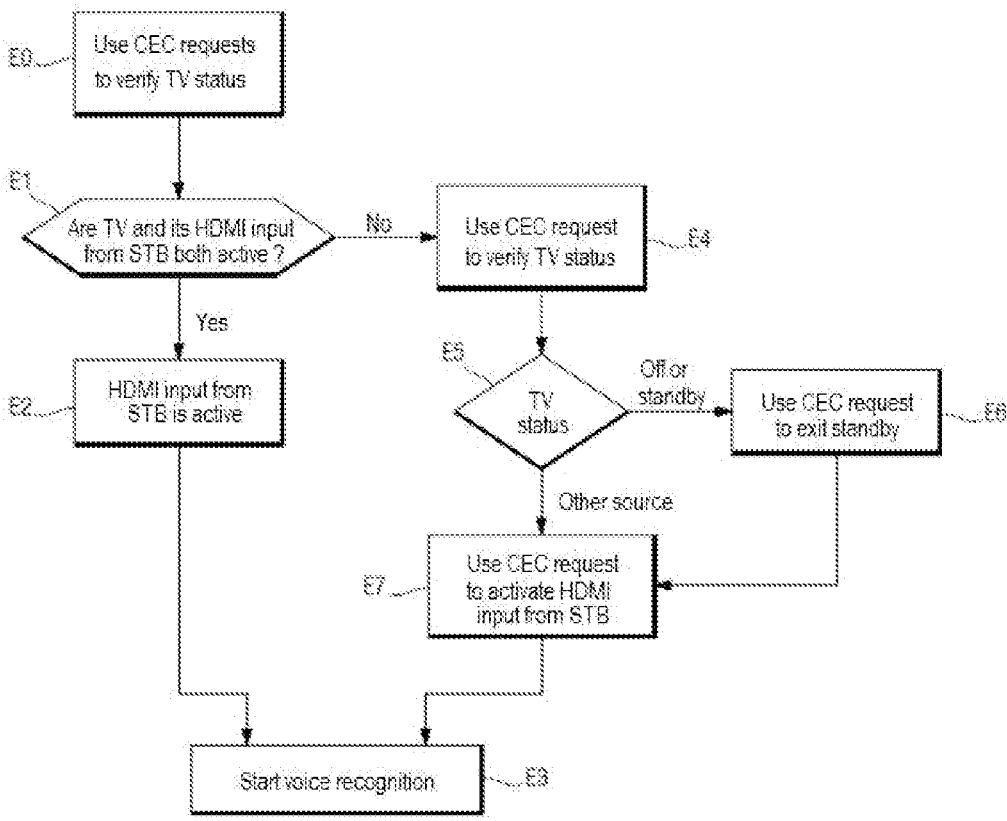
FIG. 3 shows the steps of the detection method of the invention when the television set is compatible with the CEC protocol.

With reference to FIG. 3, if the television set 2 is compatible with the CEC protocol, the method begins with a start step E0. The processor unit 8 uses a first CEC request to verify whether the following combined condition is true: the television set 2 is switched on and the active HDMI source of the television set 2 is the set-top box 1 (step E1).

If so, no additional action is needed. The processor unit 8 considers that the HDMI port 5 of the television set 2 that is connected to the HDMI port 4 of the set-top box 1 is active (i.e. that the set-top box 1 is the active HDMI source): step E2. The set-top box 1 then issues the request to start the voice recognition function (i.e. it transmits the resultant signal Sr to the remote servers): step E3.

If not, the processor unit 8 produces a second CEC request (step E4) in order to obtain the status of the television set 2 (step E5).

If the television set 2 is on standby, the processor unit 8 produces a first command via a third CEC request to take the television set 2 out of its standby status (step E6).

In step E5, if the television set 2 is switched on, the processor unit 8 considers that the active HDMI source of the television set 2 is not the set-top box 1.

Following the step E5 or the step E6, the processor unit 8 produces a second command, via a fourth CEC request, in order to activate the HDMI port 5 and thus cause the set-top box 1 to become the active HDMI source of the television set 2: step E7.

The set-top box 1 then issues the request to start the voice recognition function: step E3.

Nevertheless, not all television sets are compatible with the CEC protocol. If the television set 2 does not support the CEC function, the processor unit 8 of the set-top box 1 needs to make use of a two-part detection method, initially determining whether the television set 2 is switched on, and then verifying which source is its active source.

Figure 4:
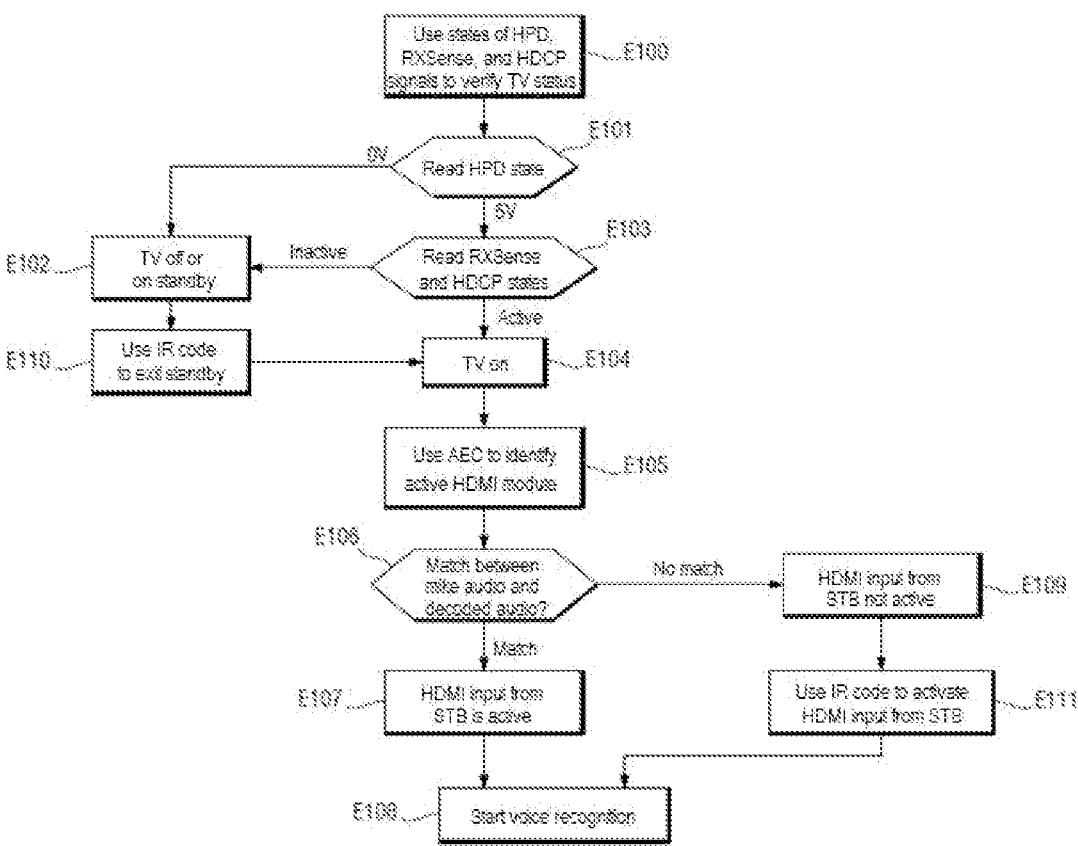
FIG. 4 shows the steps of the detection method of the invention when the television set is not compatible with the CEC protocol.

With reference to FIG. 4, the processor unit 8 thus performs an alternative method making use of a hot plug detection (HPD) signal, followed by an RXSense signal forming part of transition minimized differential signaling (TMDS) and/or by a signal generated by a high-bandwidth digital content protection (HDCP) protocol. The method begins with a starting step E100.

The processor unit 8 begins by reading the state of the HPD signal (step E101). If it is in a low state (typically 0 volts (V)), the processor unit 8 deduces that the television set 2 is switched off or on standby (step E102).

If it is in a high state (typically 5 V), the processor unit 8 reads the state of the RXSense signal and the state of the signal generated by the HDCP protocol (step E103).

The state of the RXSense signal serves to detect whether the set-top box 1 is sending a video signal and/or an audio signal to the television set 2 and thus whether the set-top box 1 is the active HDMI source of the television set 2.

The HDCP is an encryption method serving to protect the audio/video contents passing via HDMI between the source (in this example the set-top box 1) and a receiver (in this example the television set 2). Once authentication is established by exchanging the encryption key, a link integrity check is sent once every second at the initiative of the television set 2 and needs to be acknowledged by the set-top box 1. This request serves to verify that encryption synchronization is being maintained between the set-top box 1 and the television set 2. Thus, the content sent by the set-top box 1 can be viewed on the television set 2.

When the television set 2 is on standby, it no longer sends the link integrity check request. The absence of this request thus serves to determine that the television set 2 is on standby.

The signal that is generated by the HDCP protocol and that is used in this example is thus the link integrity check request.

Figure 5:
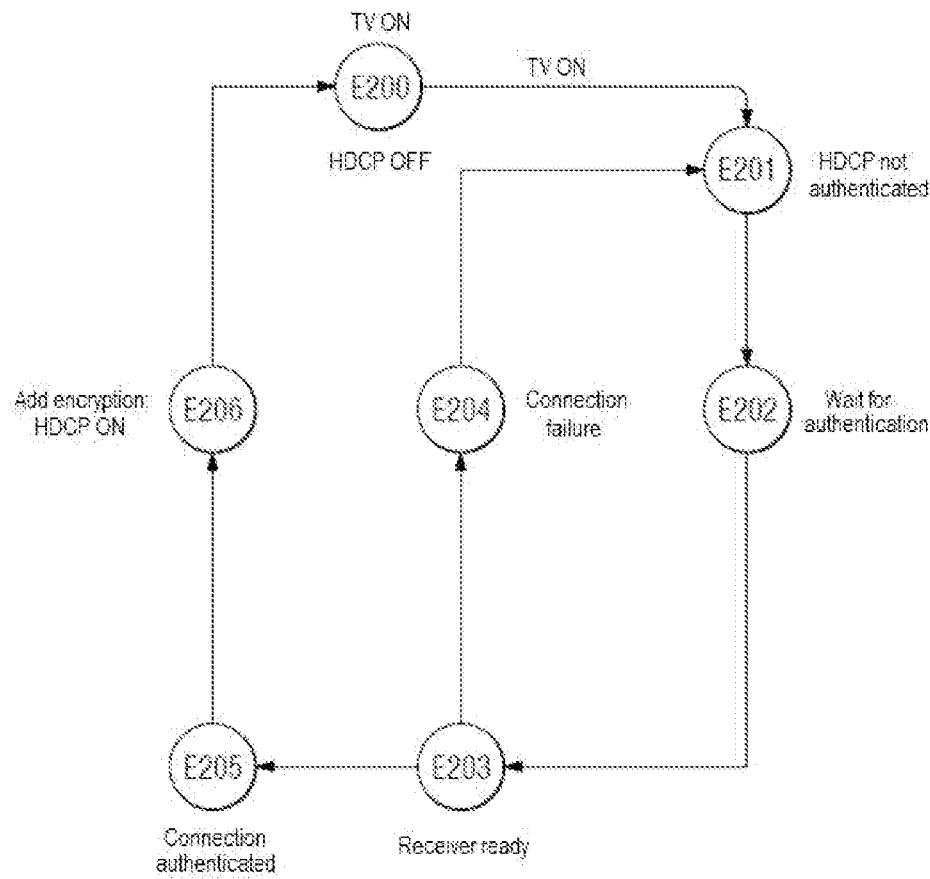
FIG. 5 shows steps of an HDCP negotiation process.

The HDCP negotiation protocol is shown in FIG. 5.

In step E200, the television set 2 is not powered (switched off) and the HDCP is inactive. Thereafter, the television set 2 is powered (switched on), and the protocol moves to step E201. The HDCP is not yet authenticated. The protocol moves to step E202 and waits for authentication of the set-top box 1. In step E203, the set-top box 1 is ready. In step E204, the connection has failed and the protocol returns to step E201. In step E205, the connection has not failed and the link is authenticated. The protocol moves to step E206 during which encryption is added to the stream, so HDCP is active—until the television set 2 is switched off.

Thus, returning to FIG. 4, in step E103, if the states of the RXSense signal and of the signal generated by the HDCP protocol are both inactive, the processor unit 8 deduces that the television set 2 is switched off or on standby (step E102). In contrast, if the states of the RXSense signal and of the signal generated by the HDCP protocol are both active, the processor unit 8 deduces that the television set is switched on (step E104).

It should be observed that use is made at this point both of the RXSense signal and of the signal generated by the HDCP protocol in order to detect whether the television set 2 is switched on, thereby confirming the result of the detection (and thus making it more robust). Nevertheless, this is not essential, and it would be possible to use only one of these two signals.

The steps described above serve to determine whether the television set 2 is switched on or off, however they do not make it possible to know which source is being played back by the television set 2. Specifically, television sets leave both the TMDS signals and HDCP active even if another input is being displayed. This is for the purpose of being able to switch instantaneously from one input to another without involving lengthy authentication stages.

Thus, following step E104, it is appropriate to determine whether the set-top box 1 is or is not the active HDMI source of the television set 2.

To do this, the processor unit 8 makes use of the echo canceller module 16 as described above.

The processor unit 8 uses the HDMI port 4 to issue an issued audio signal Sae that comprises at least a test signal St, and it issues the issued audio signal Sae to the television set 2 via the HDMI port 4, the HDMI cable 3, and the HDMI port 5 (step E105). This means that, if the set-top box 1 is already issuing an issued audio signal Sae (i.e., for example, an audio signal associated with a video signal and coming from a stream TS), then the processor unit 8 inserts the test signal St into said issued audio signal Sae. Otherwise, the processor unit 8 issues an issued audio signal Sae that comprises only the test signal St. Advantageously, the test signal St is not audible for a human being.

The processor unit 8 then acquires the received audio signal Sar as produced by the microphones 7 of the set-top box 1.

The processor unit 8 then determines whether the resultant signal Sr, which is representative of the difference between the received audio signal Sar and the issued audio signal Sae, is less than a predetermined threshold (a static threshold): step E106. If so, the processor unit 8 deduces that the HDMI port 5 of the television set 2 is active and that the set-top box 1 is indeed the active HDMI source of the television set 2 (step E107). The processor unit 8 produces a request to start the voice recognition function (step E108).

In contrast, if this is not so, the processor unit 8 deduces that the HDMI port 5 is not active and that the set-top box 1 is not the active HDMI source of the television set 2 (step E109).

Following step E102, i.e. if the television set 2 is not switched on, the processor unit 8 produces the first command and transmits it to a remote control 18 of the set-top box 1 (step E110) to cause it to produce a first secondary command for switching on the television set 2 (step E104). The remote control 18 can be seen in FIG. 1.

Likewise, following step E109, if the set-top box 1 is not the active HDMI source of the television set 2, the processor unit 8 produces the second command and transmits it to the remote control 18 so as to cause it to produce a second secondary command for causing the set-top box 1 to become the active HDMI source of the television set 2 (step E111).

The remote control 18 includes both a radiofrequency (RF) communication module 20 and an infrared (IR) communication module 21. The set-top box 1 includes an RF communication module 22. The television set 2 includes an IR communication module 23.

The set-top box 1 and the remote control 18 can thus communicate via the RF communication modules 20 and 22. The RF connection is a bidirectional Bluetooth low energy (BLE) connection. Communication between the set-top box 1 and the remote control 18 takes place using the generic attribute profile (GATT) method.

It should be observed that it is possible to use other bidirectional protocols for enabling the set-top box 1 and the remote control 18 to communicate, such as ZigBee (RF4CE profile).

Depending on whether the method is to be found in step E102 or in step E109, the processor unit 8 begins by acquiring a first IR code or a second IR code, the first IR code being used by the remote control 18 to produce the first secondary command and the second IR code being used by the remote control 18 to produce the second secondary command.

In order to acquire the first and second IR codes, the set-top box 1 accesses extended display identification data (EDID) for the television set 2.

The EDID is a table stored in each HDMI television set and it contains the identification of the set together with the list of all of the video and audio formats that it supports. This table is necessarily read and then stored in the set-top box 1 each time the television set 2 and/or the set-top box 1 leaves standby status. The EDID serves in particular to determine the manufacturer and the model of the television set 2, and thus to deduce which IR codes are to be used (from a correspondence table). Usually, knowing the manufacturer of the television set suffices to determine the appropriate IR code.

Alternatively, in order to know the IR codes, the processor unit 8 could acquire identification information for the television set 2 as supplied by a user via a configuration menu of the set-top box 1, or it could acquire identification information for the television set 2 as supplied by the user via a setup procedure performed using the remote control 18.

The processor unit 8 of the set-top box thus makes use of the remote control 18 that is normally for the purpose of controlling the set-top box 1, in order to act on the television set 2 so as to switch it on or so as to activate the HDMI port 5.

Thus, in step E110, the processor unit 8 uses the BLE link to send the first command, which is a proprietary command, to the remote control 18. The remote control 18 uses the first IR code to produce the first secondary command that switches the television set 2 on. The method then moves to step E104.

Likewise, in step E111, the processor unit 8 uses the BLE link to send the second command, which is a proprietary command, to the remote control 18. The remote control 18 uses the second IR code to produce the second secondary command, whereby the set-top box 1 becomes the active HDMI source of the television set 2. The method then moves to step E108.

It should be observed that, once the television set 2 has been woken up, the set-top box 1 may either activate the voice recognition function and send the voice utterance to the remote servers, or else it may again detect the status of the television set 2 before potentially activating the voice recognition function.

Naturally, the invention is not limited to the implementation described but covers any variant coming within the ambit of the invention as defined by the claims.

As described above, the voice recognition function is performed in part only in the set-top box. Nevertheless, the set-top box could perform the voice recognition function in full; under such circumstances, the resultant signal would not be transmitted to remote servers.

The request for starting the voice recognition function therefore does not necessarily consist in transmitting the resultant signal; it could be of a different nature, e.g. it could merely be an activation command.

The invention claimed is:

1. A detection method, performed in a set-top box that does not include a loudspeaker and having an HDMI port connected via an HDMI cable to a television set, the detection method being performed prior to applying a voice recognition function to a voice signal uttered by a user and picked up by the set-top box, the detection method comprising:

detecting a keyword in said voice signal and then:

verifying that the television set is switched on, and if not, producing a first command for switching the television set on;

verifying that the set-top box is an active HDMI source of the television set, and if not, producing a second command for causing the set-top box to become the active HDMI source of the television set; and while the television set is switched on and the set-top box is the active HDMI source of the television set, producing a request to start the voice recognition function on said voice signal.

2. The detection method according to claim 1, further comprising verifying that the television set is compatible with a CEC protocol and, if so, of using the CEC protocol to verify that the television set is switched on and that the set-top box is the active HDMI source of the television set, and, if necessary, to produce the first command and/or the second command.

3. The detection method according to claim 1, comprising, for verifying that the television set is switched on, using an HPD signal, and then an RXSense signal and/or a signal generated by an HDCP protocol.

4. The detection method according to claim 1, comprising, for verifying that the set-top box is the active HDMI source of the television set:

using the HDMI port to issue an issued audio signal comprising a test signal;

acquiring a received audio signal produced by one or more microphones of the set-top box;

determining whether a resultant signal, which is representative of the difference between the received audio signal and the issued audio signal, is less than a predetermined threshold; and if so, deducing that the set-top box is indeed the active HDMI source of the television set.

5. The detection method according to claim 4, wherein the set-top box incorporates an echo canceller module, and the resultant signal isa signal output by the echo canceller module.

6. The detection method according to claim 1, wherein, if the television set is not switched on and/or if the decoder is not the active HDMI source of the television set, the first command and/or the second command are transmitted to a remote control of the set-top box to cause the remote control to produce a first secondary command for switching the television set on and/or a second secondary command to cause the set-top box to become the active HDMI source of the television set.

7. The detection method according to claim 6, wherein the remote control is arranged to control the television set via an infrared link, the detection method further comprising the steps of acquiring a first infrared code and/or a second infrared code and of transmitting the first infrared code and/or the second infrared code to the remote control, the first infrared code being used by the remote control to produce the first secondary command and the second infrared code being used by the remote control to produce the second secondary command.

8. The detection method according to claim 7, wherein acquisition of the first infrared code and/or of the second infrared code consists in accessing an EDID of the television set, or in acquiring identification information for the television set as provided by a user via a menu for configuring the set-top box, or in acquiring identification information for the television set as provided by the user via a setup procedure performed with the remote control.

9. A set-top box comprising an HDMI port, at least one microphone, and a processor unit arranged to perform the detection method according to claim 1.

10. A non-transitory, computer-readable storage medium storing a computer program including instructions that cause a processor unit of a set-top box comprising an HDMI port, at least one microphone, and the processor unit arranged to execute the detection method according to claim 1.

\* \* \* \* \*